(12) United States Patent
Shore

(10) Patent No.: US 10,245,574 B1
(45) Date of Patent: Apr. 2, 2019

(54) MICROWAVE REACTOR VESSEL

(71) Applicant: Gjergji Josif Shore, Mississauga (CA)

(72) Inventor: Gjergji Josif Shore, Mississauga (CA)

( * ) Notice: Subject to any disclaimer, the term of this patent is extended or adjusted under 35 U.S.C. 154(b) by 0 days.

(21) Appl. No.: 15/618,205

(22) Filed: Jun. 9, 2017

(51) Int. Cl.
*B01J 19/24* (2006.01)
*B01J 19/00* (2006.01)

(52) U.S. Cl.
CPC .......... *B01J 19/0013* (2013.01); *B01J 19/24* (2013.01); *B01J 2219/00141* (2013.01); *B01J 2219/24* (2013.01)

(58) Field of Classification Search
CPC .............................. B01J 19/24; B01J 19/0013
USPC .......................................................... 422/202
See application file for complete search history.

(56) References Cited

U.S. PATENT DOCUMENTS

| | | | | |
|---|---|---|---|---|
| 4,775,770 A | * | 10/1988 | Fritz | A23L 3/01 219/697 |
| 6,080,976 A | * | 6/2000 | Nara | F24H 3/0405 219/687 |
| 6,478,911 B1 | * | 11/2002 | Wang | C03B 27/00 156/109 |
| 2003/0175132 A1 | * | 9/2003 | Ishikawa | F04D 19/042 417/353 |
| 2005/0236410 A1 | * | 10/2005 | Hisamatsu | H05B 6/6473 219/757 |
| 2011/0031238 A1 | * | 2/2011 | Segawa | C04B 35/64 219/702 |
| 2013/0175261 A1 | * | 7/2013 | Chang | H05B 6/64 219/699 |

* cited by examiner

*Primary Examiner* — Huy Tram Nguyen
(74) *Attorney, Agent, or Firm* — Gulf Coast Intellectual Property Group

(57) ABSTRACT

A microwave reactor constructed to produce a homogeneous heat distribution across the body of the microwave reactor subsequent exposure to microwave irradiation. The microwave reactor includes a body having an exterior wall transparent to microwave irradiation. A microwave sensitized element layer is adjacent the exterior wall and is comprised of a carbide mixture wherein the carbide mixture includes a carbide mixed with either a metal oxide, a ferrite or a nitride. The carbide mixture is in granular form wherein the carbide has a larger particle size than the other component. The microwave sensitized element layer further includes a metal layer that extends the length thereof. The metal layer is positioned in various arrangements within or adjacent to the carbide mixture. The body further includes an inner layer adjacent to the microwave sensitized layer opposite the exterior wall. The inner layer is transparent to microwave irradiation.

13 Claims, 4 Drawing Sheets

MICROWAVE REACTOR VESSEL

FIELD OF THE INVENTION

The present invention relates generally to microwave assisted apparatus for heating a media, more specifically but not by way of limitation, a microwave reactor vessel that includes a wall having a microwave sensitized element that is operable to produce heat with reduced power and further functions to provide a homogeneous temperature profile across the reactor vessel.

BACKGROUND

Microwave reactors are known in the art and are utilized to apply microwave radiation to a chemical reaction to a media disposed within the reactor vessel. The application of microwave radiation to a reactor vessel results in the heating of the vessel and as such the media disposed therein and the purpose thereof is to execute a desired organic synthesis. Conventional synthesis methods will utilize other sources of heat such as but not limited to an electric heater or a flame. These methods have proven to be slow and inefficient as conventional heating is dependent upon thermal conductivity. These conventional processes require a significant amount of energy and have shown to produce inconsistent distribution of temperature across the vessel and media disposed therein.

The process of heating by microwave radiation is based on the remote energy transfer to materials by dielectric heating with microwaves. The irradiated materials absorb the microwave energy exposure and convert the energy to heat. Various microwave reactor vessel exist and are constructed from alternate materials. Conventional microwave reactor vessels are manufactured from materials such as but not limited to quartz, ceramic and certain types of glass such as but not limited to borosilicate glass. The aforementioned exemplary construction of conventional microwave reactor vessels result in a transparent to microwave irradiation and as such ensure the energy transfer occurs in the media disposed within the vessel so as to avoid the overheating of the vessel itself.

There are two known types of microwave devices, multimode and monomode devices. Multimode devices are similar to household microwave ovens. Monomode microwave devices are more commonly utilized in chemical and pharmaceutical applications. Monomode reactors have relatively small interiors and the irradiation is directed by a rectangular or circular waveguide onto the reactor vessel which is located a fixed distance from the irradiation source. The two main factors that determine the propensity of heat generation and distribution inside a microwave reactor vessel are structural composition and penetration depth of microwaves.

One problem with existing microwave reactor vessels is the material has a non-homogeneous structural composition which results in a relatively low penetration depth of microwaves. Existing structural compositions of microwave reactor vessels make it very difficult to achieve uniform heat distribution inside the microwave irradiated media.

Accordingly, there is a need for a microwave reactor vessel that provides a superior structure for heating media disposed therein wherein the microwave reactor wall includes a microwave sensitive element that the heat thereof can be transferred to the media disposed within the reactor so as to ensure a homogeneous temperature distribution.

SUMMARY OF THE INVENTION

It is the object of the present invention to provide a microwave reactor vessel having a structural composition configured to provide a homogeneous temperature distribution of media disposed therein that includes a microwave sensitized element in the wall of the reactor.

Another object of the present invention is to provide a microwave reactor vessel operable to facilitate chemical and/or non-chemical processes by providing heat thereto wherein the heating of the microwave sensitized element is transferred via conductivity to the media disposed within the reactor vessel.

A further object of the present invention is to provide a microwave reactor vessel having a structural composition configured to provide a homogeneous temperature distribution of media disposed therein wherein the microwave sensitized element is comprised of a primary non-metal carbide element and a secondary non-metal element.

Still another object of the present invention is to provide a microwave reactor vessel operable to facilitate chemical and/or non-chemical processes by providing heat thereto wherein the secondary non-metal element is a metal oxide.

An additional object of the present invention is to provide a microwave reactor vessel having a structural composition configured to provide a homogeneous temperature distribution of media disposed therein wherein the secondary non-metal element comprising the microwave sensitized element could further be comprised of a ferrite or a nitride.

Yet a further object of the present invention is to provide a microwave reactor vessel operable to facilitate chemical and/or non-chemical processes by providing heat thereto wherein the primary non-metal carbide element comprises fifty to ninety-nine percent of the microwave sensitized element.

Another object of the present invention is to provide a microwave reactor vessel having a structural composition configured to provide a homogeneous temperature distribution of media disposed therein wherein the microwave sensitized element further includes a thin metallic film extending therethrough.

An alternative object of the present invention is to provide a microwave reactor vessel operable to facilitate chemical and/or non-chemical processes by providing heat thereto wherein the primary non-metal element and the secondary non-metal element can be either solid or granular in form.

An additional object of the present invention is to provide a microwave reactor vessel having a structural composition configured to provide a homogeneous temperature distribution of media disposed therein wherein the secondary non-metal element is sized either equal to or less than the primary non-metal element.

Yet a further object of the present invention is to provide a microwave reactor vessel operable to facilitate chemical and/or non-chemical processes by providing heat thereto wherein the general formula for the primary non-metal element is $A_nC_m$.

Another object of the present invention is to provide a microwave reactor vessel having a structural composition configured to provide a homogeneous temperature distribution of media disposed therein wherein the secondary non-metal element has a general formula of at least one of the following: $D_gO_p$; $L_bFE_2O_4$ or $M_zN_y$.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
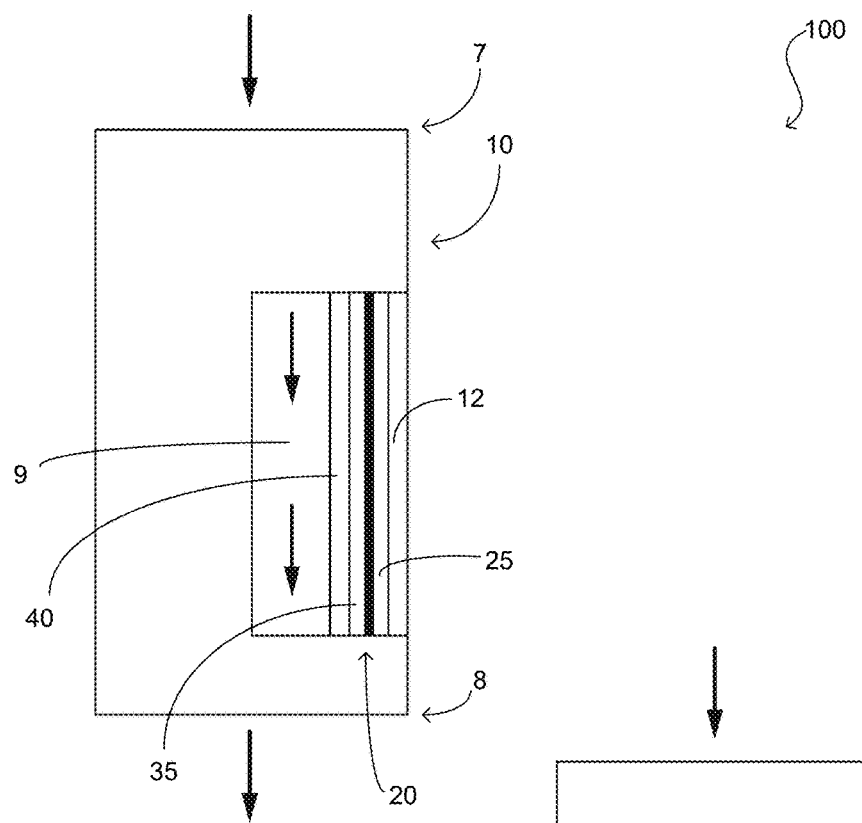
FIG. 1 is a side cross-sectional view of a microwave vessel reactor body of the present invention.

Referring now to the drawings submitted herewith, wherein various elements depicted therein are not necessarily drawn to scale and wherein through the views and figures like elements are referenced with identical reference numerals, there is illustrated microwave reactor vessel 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Figure 2:
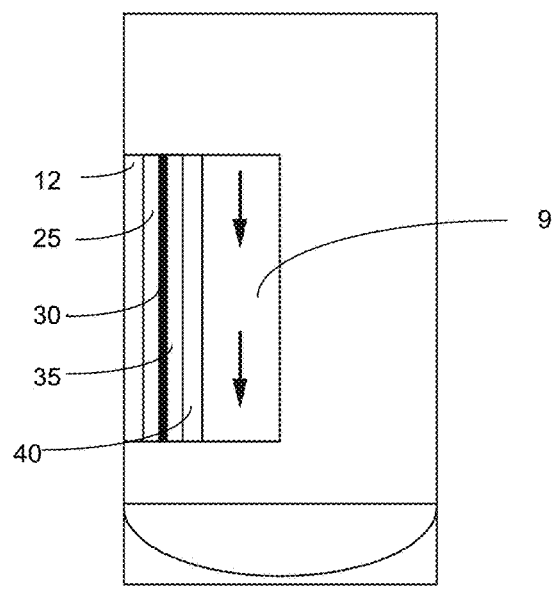
FIG. 2 is a cross-sectional view of the present invention.
Figure 3:
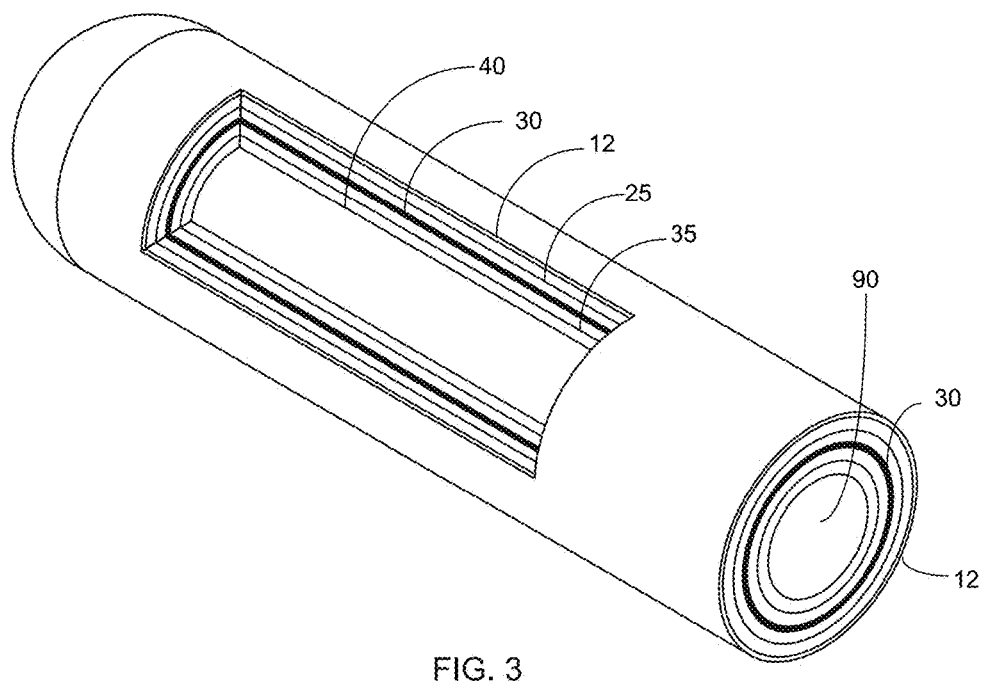
FIG. 3 is a cut-away perspective view of an embodiment of the present invention.
Figure 4:
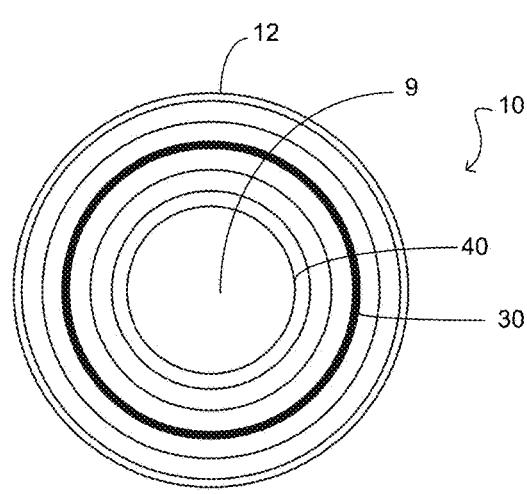
FIG. 4 is a cross-sectional view of the vessel reactor body of the present invention.

Referring in particular to FIGS. 1 and 2 the microwave reactor vessel 100 includes body 10. The body 10 is manufactured from a suitable material for conducting chemical and/or non-chemical processes wherein the body 10 is subjected to various microwave radiation as part of a chemical and/or non-chemical processes. It should be understood within the scope of the present invention that the body 10 could be formed in various sizes and shapes and the dimensions of the body are not subject to minimal or maximal requirements other than that required by the process. It should be further understood that the body 10 could be constructed as a flow-through reactor wherein the materials traverse through the interior volume 9 of the body 10 from a first end 7 to a second end 8 or as enclosed reactor wherein materials are deposited within the interior volume 9 of the body 10 and remain therein during the course of the chemical and/or non-chemical processes. The body 10 includes an exterior wall 12. The exterior wall 12 is constructed to receive direct microwave irradiation, which provides heat in order to facilitate the desired chemical and/or non-chemical processes. The exterior wall 12 is manufactured from microwave transparent materials so as to facilitate the passage of the microwave irradiation therethrough to subsequent layers of the body 10 as will be further discussed herein. It is contemplated within the scope of the present invention that the exterior wall 12 could be manufactured from numerous materials in order to accomplish the foregoing stated objective. By way of example but not limitation, the exterior wall 12 could be manufactured from materials such as: borosilicate glass, quartz, fiberglass, plexiglass, ceramic, ceramic fiber, carbon fiber, calcium silicate or Teflon.

Adjacent to the exterior wall 12 is a microwave sensitized element layer 20. The microwave sensitized element layer 20 includes first layer 25 and second layer 35 manufactured from a mixture of first material and a second material. The microwave sensitized element layer 20 further includes a metal film layer 30. As will be further discussed herein, it should be understood that alternate configurations of construction of the microwave sensitized element layer 20 are within the scope of the present invention that could be organized into a first layer and second layer only. The first layer 25 and second layer 35 are manufactured from a mixture of a first material and a second material wherein the first material is a carbide. The first material of the present invention is a carbide having the general formula of $A_nC_m$. N and M in the general formula for the carbide mixture are full integers such as but not limited to 1, 2 and 3. The C in the general formula represents carbon while the A could be comprised of various elements. It is contemplated within the scope of the present invention that the A could represent the following elements: Si, Mg, Ti, Al, Fe, W, Cr and B. It should be understood that the first material of the present invention could be produced in either a solid or granular form. A preferred embodiment of the first material of the present invention is granular and is discussed herein for exemplary purposes. The first material is desired as disclosed as carbides have the required semi-conductive properties and provide excellent absorption of electromagnetic energy to produce heat. Additionally, carbides are efficient heat conductors. Microwave penetration depth of carbides at ambient temperature can range from 2 millimeters to over 5 centimeters depending upon purity and structure of the carbide. As higher temperatures result in lower microwave penetration depth due to the conductivity of carbides, the second material to create the carbide mixture of the first layer 25 and second layer 35 is required to provide the desired functionality of the present invention discussed herein.

The first layer 25 and second layer 35 of the microwave sensitized element layer 20 further includes a second material that forms the mixture of the present invention which comprises the first layer 25 and second layer 35. The second material mixed with the carbide to form the first layer 25 and second layer 35 is comprised of at least one of the following general formulas: $D_gO_p$; $L_bFE_2O_4$ or $M_zN_y$. It is desired within the scope of the present invention that the particle size of the second material is less than that of the particle size of the first material when constructed in granular form. A particle size of the second material that is less than that of the particle size of the first material functions to fill the void intermediate the particles of the first material. The aforementioned particle size of the second material provides a construction of the first layer 25 and second layer 35 that functions to minimize microwave reflection from the carbide particles. If carbide particles become reflective, then they will serve as a barrier to microwave energy, preventing the microwave energy from penetrating further inside the microwave sensitized element. The penetration depth of microwave irradiation will be significantly decreased, causing only a narrow layer of the microwave sensitized element to be heated. The energy efficiency of the device can also decrease significantly since a considerable part of the irradiation will be reflected off, instead of being transformed into heat. Further the benefits of the described construction of the carbide mixture of the present invention are improved microwave absorption, heat generation and distribution upon exposure to microwave irradiation as the second material is microwave active. The second material and its aforementioned particle size functions to substantially eliminate any void volume present in the first layer 25 and second layer 35. Elimination of void volume provides improved structural stability and microwave absorption, which provides improved energy efficiency of the microwave reactor vessel 100. The second material of the mixture of the present invention utilized to construct the first layer 25 and third layer 35 minimize microwave reflection from the carbides and add to the heat generation.

As previously stated herein the second material is comprised of at least one of the following general formulas: $D_gO_p$; $L_bFe_2O_4$ or $M_zN_y$. $D_gO_p$ is a metal oxide where G and P are full integers. D represents one of the following elements: Co, Cr, Fe, Mn, Ni, Al or Ca and O represents oxygen. A second embodiment of the second material is $L_bFe_2O_4$. The second embodiment of the second material is a ferrite where L represent one of the following elements: Mn, Ni, Cu, Zn, Mg, Co and Fe represents iron. O represent oxygen and B is a full integer such as but not limited to 1, 2 or 3. A third embodiment of the second material is a nitride having the general formula of $M_zN_y$. Z and Y are full integers such as but not limited to 1, 2 or 3. M represents on of the following elements: Cr, Al, Mg, Ca, Si, B, Ti or N. N represents nitrogen.

Figure 5:
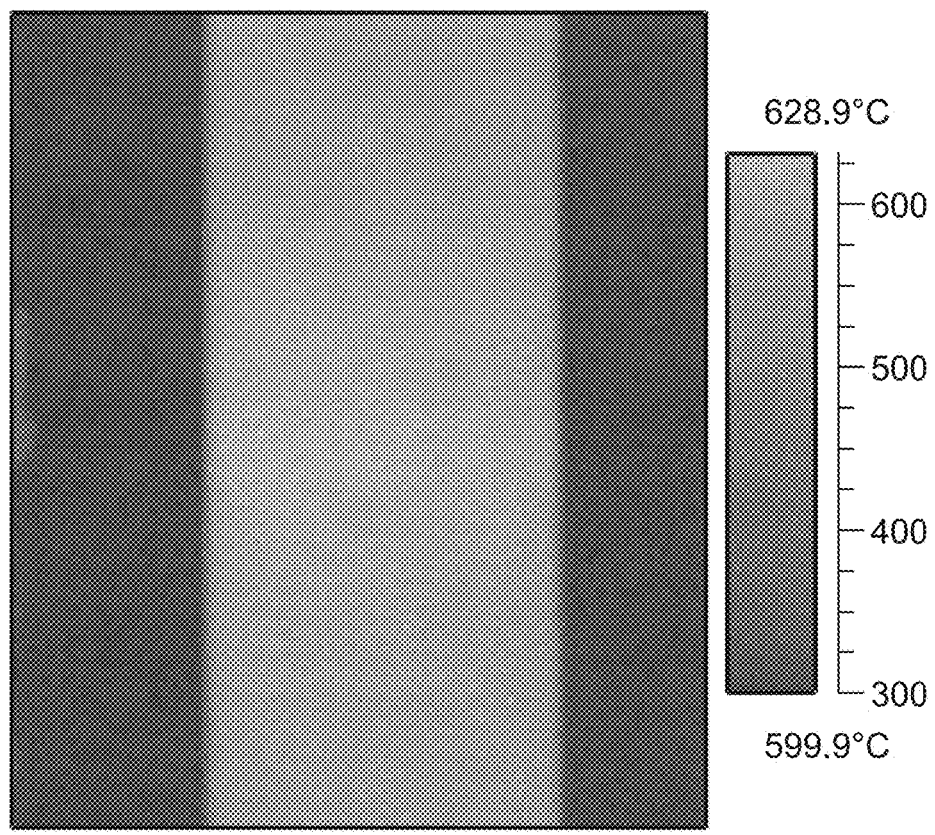
FIG. 5 is an exemplary temperature distribution of the reactor vessel of the present invention.

The percentages of the first material within the mixture creating the first layer 25 and second layer 35 ranges from fifty to ninety-nine percent by weight. The construction of the microwave sensitized element layer 20 is such that the thickness of the first layer 25 and second layer 35 combined could range from ten microns to ten centimeters. As will be further discussed herein the microwave sensitized element layer 20 includes metal film layer 30 and depending upon the positioning thereof the first layer 25 and second layer 35 could be combined to form a single layer as an alternate configuration of the first layer 25 and second layer 35 discussed herein. The thickness and composition of the first layer 25 and second layer 35 is adjusted to produce a desired amount of heat upon exposure to microwave irradiation. The distribution of the heat produced by the microwave sensitized element layer 20 is homogeneous and a temperature plot of the body 10 is provided in FIG. 5 herein.

The microwave sensitized element layer 20 further includes a metal film layer 30. The metal film layer 30 is a thin metallic film having a uniform thickness and extends the entire length of the body 10. It is contemplated within the scope of the present invention that the metal film layer 30 can be prepared utilizing various suitable methods such as but not limited to vacuum vapor deposition or chemical deposition, or it can be obtained through manufacturing process using available metal works technologies. The metal film layer 30 can be positioned within the microwave sensitized element layer 20 in alternate positions with the exemplary positioning illustrated herein being disposed so as to create a first layer 25 and second layer 35 of generally equal thicknesses on opposing sides of the metal film layer 30. It is contemplated within the scope of the present invention that the metal film layer 30 could be positioned in alternate positions as previously discussed herein. The metal film layer 30 is manufactured in either a mesh or solid construction and has a thickness ranging from 200 nanometers to 200 microns. The metal film layer 30 is manufactured from a suitable metal such as but not limited to titanium, tungsten, steel or suitable metal alloys. It is contemplated within the scope of the present invention that the metal film layer 30 could be placed in only a portion of the microwave sensitized element layer 20 as desired for particular applications. The metal film layer 30 could be formed in various configuration such as but not limited to strips, wires arranged either parallel or perpendicular to the axis of the microwave reactor vessel 100. The metal film layer 30 is placed at the end of the microwave penetration depth of the carbide mixture of the present invention and functions to provide heat amplification over and above the amount of heat generated by the carbide mixture and prevent further penetration of the microwave irradiation so as to prevent the microwave irradiation from contacting the inner layer 40 or the interior volume 9 and materials disposed therein. The penetration depth of the carbide mixture of the present invention is the distance at which the intensity of the microwave irradiation falls below 1/e, where e is equal to 2.71828 or approximately thirty seven percent of the generated intensity. It should be recognized by those skilled in the art that the penetration depth will vary based upon the percentages of the first material and second material. By way of example but not limitation, if a higher temperature is required for the microwave reactor vessel 100 the metal film layer 30 is positioned within the microwave sensitized element layer 20 closer to microwave irradiation source. Both the above mentioned non-metal carbide mixture and thin metallic films are capable of generating heat under microwave irradiation conditions when used separately. However the combination of both elements under the same design can provide the best results by eliminating any shortcomings associated with separate application of these elements. A non-metal carbide mixture by itself requires a considerable amount of time and microwave power to generate an appreciable amount of heat and therefore temperature for the system under microwave irradiation. Alternatively, a thin metallic film under microwave irradiation can generate a profuse amount of heat in just seconds requiring a minimal amount of microwave power, however the metallic film can be prone to violent electrical discharges/arcing in the microwave chamber ultimately causing significant damage to the device. Application of both these elements utilized in combination ensures the reliability of the system and achievement of very high temperatures with minimal microwave power. The majority of the microwave power is absorbed by the non-metal carbide mixture allowing the thin metal film to absorb a reduced amount of microwave irradiation that will nevertheless contribute to a fast generation of heat. The metal film is isolated within the non-metal carbide mixture in an almost air-tight environment so as to significantly reduce the occurrence of electrical arcing. Any incidental arcing can then be absorbed by the carbide mixture particles in contact with the metal film layer. Very high temperatures can be achieved in the matter of seconds using the design of the present invention.

The body 10 further includes an inner layer 40 that is adjacent the interior volume 9. The inner layer 40 is in direct contact with any materials disposed in or flowing through the interior volume 9. The main function of the inner layer 40 is to transfer the heat of the microwave sensitized element layer 20 the materials within the interior volume 9. The inner layer 40 is constructed from materials such as but not limited to borosilicate glass, quartz, fiberglass, plexiglass, ceramic, ceramic fiber, carbon fiber, calcium silicate, Teflon, stainless steel, aluminum or other metal alloys.

Figure 6:
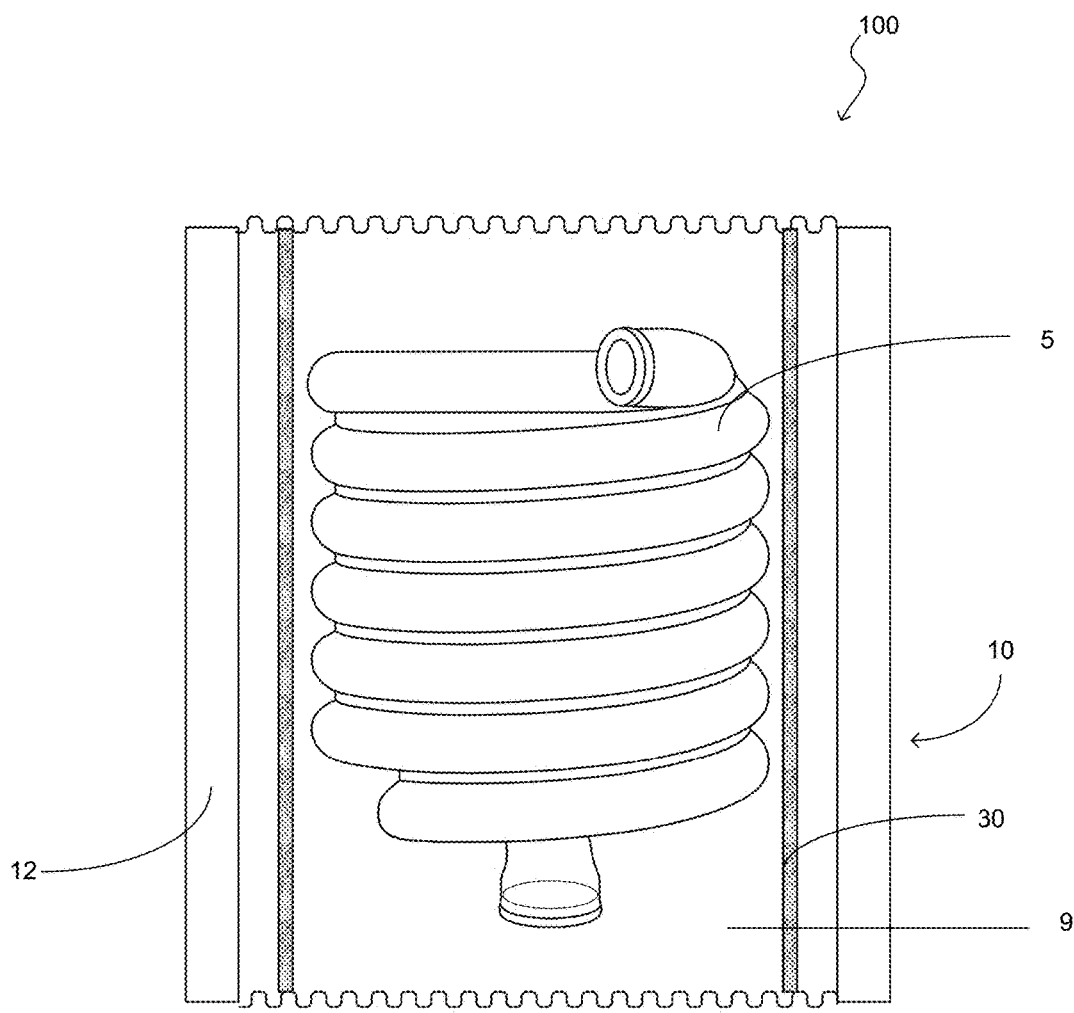
FIG. 6 is a an exemplary embodiment of the present invention with an inner coil.

While not particularly illustrated herein, it is contemplated within the scope of the present invention that the body 10 could be partially or completely covered with a thermal insulation material to reduce heat loss to the environmental surroundings and provide a means for an individual to grasp the microwave reactor vessel 100. As shown in FIG. 6 herein, the microwave reactor vessel 100 could be provided in an alternative embodiment wherein the interior volume 9 has a inner coil 5 constructed to have materials disposed therein. The construction of the body 10 is identical to what has been disclosed herein with the exception that the metal film layer 30 is placed adjacent to the interior volume 9 and the first material and second material utilized to create the carbide mixture of the present invention is disposed intermediate the metal film layer 30 and the exterior wall 12. It should be understood by those skilled in the art that the microwave reactor vessel 100 could be utilized in numerous applications. By way of example but not limitation, the microwave reactor vessel 100 could be utilized to thermally treat waste for biofuel production, beverage/milk/juice pasteurization and ultra high temperature treatment, DNA amplification or saline/brackish water desalination via distillation. The microwave reactor vessel 100 is constructed to be suitable for any available microwave frequency, including radio frequency, and could be used in multimode or monomode methods.

It is further contemplated within the scope of the present invention that the body 10 could be constructed so as to provide a temperature gradient across the length thereof. In order to generate a temperature gradient throughout the length of the body 10 several microwave sensitized elements of different length, composition and also containing metal film layers of different thickness can be placed adjacent to each other. This arrangement can generate a non-uniform temperature profile, thus producing a temperature gradient throughout the length of the body 10 as required by a specific process. Another preferred arrangement would be to place two or more identical microwave sensitized elements placed at a certain distance from each other so as to allow subsequent cooling of materials after being heated in the reactor zone covered by the first microwave sensitized element, then heated again when reaching the portion of the body 10 covered by the second microwave sensitized element. Any preferred heating-cooling patterns can be achieved in this way by alternating the position of microwave sensitized elements.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A reactor vessel constructed to be irradiated by microwaves comprising:
   a body, said body having an exterior wall, said body having an interior volume of suitable size to receive materials therein;
   a microwave sensitized layer, said microwave sensitized layer being adjacent said exterior wall, said microwave sensitized layer having at least a first layer and a second layer, said first layer being a mixture of a carbide and a second material, wherein the carbide of the first layer of the microwave sensitized layer is present within a range between 50 to 99 percent by weight and wherein the formula for the carbide of the first layer of the microwave sensitized layer is $A_nC_m$ with N and M being full integers and wherein A is selected from a group of elements consisting of Si, MG, Ti, Al, Fe, W, CR or B, said second layer being a metal film selected from one of the following: titanium, tungsten, steel or metal alloy and wherein the second layer of the microwave sensitized layer has a thickness ranging between 200 nanometers and 200 microns;
   an inner layer, said inner layer being adjacent said microwave sensitized layer opposite said exterior wall, said inner layer being adjacent said interior volume;
   wherein second material of the first layer of the microwave sensitized layer is selected from a group consisting of one of the following: metal oxide, ferrite or nitride and wherein the second material of the first layer of the microwave sensitized layer is present within a range between 1 to 49 percent by weight and wherein the first layer of the microwave sensitized layer is granular in form and wherein the second material has a particle size that is less than that of the carbide.

2. A microwave reactor vessel configured to be exposed to microwave irradiation comprising:
   a body, said body having an exterior wall, said body having an interior volume of suitable size to receive materials therein;

a microwave sensitized element layer, said microwave sensitized layer being adjacent said exterior wall, said microwave sensitized layer having a first layer, a second layer and a third layer, said first layer and said third layer being comprised of a mixture of a carbide and a second material, said second layer being a metal film, said second layer being intermediate said first layer and said third layer, said microwave sensitized element layer being disposed on at least a portion of said body;

an inner layer, said inner layer being adjacent said microwave sensitized layer opposite said exterior wall, said inner layer being adjacent said interior volume; and wherein said microwave sensitized element layer is configured to generate heat subsequent exposure to microwave irradiation and provide a homogeneous distribution thereof.

3. The microwave reactor vessel as recited in claim 2, wherein the second material of the first layer and the third layer of the microwave sensitized layer is selected from a group consisting of one of the following: metal oxide, ferrite or nitride.

4. The microwave reactor vessel as recited in claim 3, wherein said second layer is positioned intermediate said first layer and said third layer such that the second layer is proximate an end of microwave irradiation penetration depth of the first layer.

5. The microwave reactor vessel as recited in claim 4, wherein the penetration depth of the first layer is where the microwave irradiation reaches approximately 37 percent of its original transmitted intensity.

6. The microwave reactor vessel as recited in claim 5, wherein the formula for the carbide of the first layer of the microwave sensitized layer is $A_nC_m$ with N and M being full integers and wherein A is selected from a group of elements consisting of Si, MG, Ti, Al, Fe, W, CR or B.

7. The microwave reactor vessel as recited in claim 6, wherein the first layer of the microwave sensitized layer is granular in form and wherein the second material has a particle size that is less than that of the carbide.

8. A microwave reactor vessel constructed to be exposed to microwave irradiation and provide a homogeneous distribution of heat across the vessel comprising:

a body, said body having an exterior wall, said exterior wall being constructed of a microwave transparent material, said body having an interior volume of suitable size to receive materials therein;

a microwave sensitized element layer, said microwave sensitized layer being adjacent said exterior wall, said microwave sensitized layer having a first layer, a second layer and a third layer, said first layer and said third layer being comprised of a mixture of a carbide and a second material, said second layer being a metal film, said second layer being intermediate said first layer and said third layer, said microwave sensitized element layer being disposed substantially all of said body;

an inner layer, said inner layer being adjacent said microwave sensitized layer opposite said exterior wall, said inner layer being adjacent said interior volume, said inner layer being constructed of a microwave transparent material; and wherein the mixture of carbide and the second material is in granular form and wherein the second material has a particle size that is less than that of the carbide.

9. The microwave reactor vessel as recited in claim 8, wherein the second material of the first layer and third layer of the microwave sensitized layer is selected from a group consisting of one of the following: metal oxide, ferrite or nitride.

10. The microwave reactor vessel as recited in claim 9, wherein the carbide of the first layer and third layer of the microwave sensitized layer is present within a range between 50 to 99 percent by weight.

11. The microwave reactor vessel as recited in claim 10, wherein the formula for the carbide of the first layer of the microwave sensitized layer is $A_nC_m$ with N and M being full integers and wherein $A_n$ of the formula for the carbide of the first layer is selected from a group of one of the following: Si, Mg, Ti, Al, Fe, W, Cr and B.

12. The microwave reactor vessel as recited in claim 11, wherein the second layer is manufactured having a thickness between the range of 200 nanometers and 200 microns.

13. The microwave reactor vessel as recited in claim 12, wherein the first layer and third layer of the microwave sensitized element layer have a combined thickness of a range between 10 microns to ten centimeters.

* * * * *